(12) United States Patent
Huang et al.

(10) Patent No.: US 11,882,517 B1
(45) Date of Patent: Jan. 23, 2024

(54) MANAGING DUPLICATE DEVICE IDENTIFIERS FOR EDGE DEVICES OF CLIENT NETWORKS THAT USE A RADIO COMMUNICATION PROTOCOL

(71) Applicant: Amazon Technologies, Inc., Seattle, WA (US)

(72) Inventors: Rongsheng Huang, San Jose, CA (US); Jungtao Liu, Saratoga, CA (US); Stefan Mathias Hutchison, Oakland, CA (US); Yinghua Ye, Los Gatos, CA (US)

(73) Assignee: Amazon Technologies, Inc., Seattle, WA (US)

(*) Notice: Subject to any disclaimer, the term of this patent is extended or adjusted under 35 U.S.C. 154(b) by 64 days.

(21) Appl. No.: 17/218,547

(22) Filed: Mar. 31, 2021

(51) Int. Cl.
*H04W 48/16* (2009.01)
*H04W 60/00* (2009.01)
*H04W 12/106* (2021.01)
*H04W 84/10* (2009.01)
*H04W 76/11* (2018.01)

(52) U.S. Cl.
CPC ......... *H04W 48/16* (2013.01); *H04W 12/106* (2021.01); *H04W 60/00* (2013.01); *H04W 76/11* (2018.02); *H04W 84/10* (2013.01)

(58) Field of Classification Search
CPC . H04W 60/005; H04W 48/16; H04W 12/106; H04W 60/00; H04W 76/11; H04W 84/10; H04L 61/3015
See application file for complete search history.

(56) References Cited

U.S. PATENT DOCUMENTS

| | | | |
|---|---|---|---|
| 10,827,345 B1 | 11/2020 | Tandon et al. | |
| 2007/0004455 A1* | 1/2007 | Wennberg | H04W 8/18 455/558 |
| 2018/0160296 A1* | 6/2018 | Chastain | H04W 12/06 |
| 2020/0100157 A1 | 3/2020 | Teboulle et al. | |
| 2021/0314183 A1* | 10/2021 | Ward | H04L 65/1073 |

* cited by examiner

*Primary Examiner* — Quoc Thai N Vu
(74) *Attorney, Agent, or Firm* — Robert C. Kowert; Kowert, Hood, Munyon, Rankin & Goetzel, P.C.

(57) ABSTRACT

An IoT service of a provider network may be used to provision edge devices with duplicate device identifiers for edge devices that use a radio communication protocol (e.g., LoRaWAN). This may allow a service provider to accept legitimate registration requests from edge devices instead of automatically rejecting them. When the IoT service receives a registration request, the service determines whether there are other devices registered with the same device ID. If so, then the service determines whether to accept or reject the request. For example, the service may determine whether the number of duplicate device IDs being used for registered devices will remain within a predefined threshold if the device is registered. If so, then the service registers the device. Otherwise, the service rejects the request.

20 Claims, 9 Drawing Sheets

DevEUI (Device ID)
for LoRaWAN
202

| Vendor Code (3 bytes) | Address (5 bytes) |
|---|---|

FIG. 2

Provisioned Devices with Device ID 123
(Duplicate Device ID Threshold=3)

| Device ID | Key |
| --- | --- |
| Device ID 123 | key A |
| Device ID 123 | key B |

IoT Service (management interface) 122 → accept provision request (soft limit for the number of provisioned edge devices with device ID 123 has not been reached)

request from user to provision an edge device
(Device ID 123 & key X)

MANAGING DUPLICATE DEVICE IDENTIFIERS FOR EDGE DEVICES OF CLIENT NETWORKS THAT USE A RADIO COMMUNICATION PROTOCOL

BACKGROUND

The Internet of Things (IoT) is a phrase given for the interconnection of computing devices scattered around the globe within the existing internet infrastructure. Clients of a remote service provider may leverage the internet-based connectivity of IoT devices (also referred to herein as edge devices) by using a service offered by the service provider. For example, temperature sensors at a client site may collect temperature values for different equipment and transmit them to the service provider for analysis, such as determining whether a machine needs servicing.

A client's network may include edge devices that communicate wirelessly using a particular radio communication protocol. A service provider may provide a service that manages edge devices for many different clients, resulting in an edge network that includes a large number of edge devices. When an edge device requests to join the edge network, the edge device may provide a device ID in order to uniquely identify the edge device. For example, a low-power wide-area network ("LoRaWAN") radio protocol specifies a certain number of bits to be used to provide as the device ID of the edge device when requesting to join the edge network. In some cases, a service provider may receive multiple join requests for different edge devices that provide the same device ID. When a request provides a device ID that has already been registered with the service for another device, then the request will be rejected. This behavior may be undesirable because the in many cases, the request may be a legitimate request from a client to register an edge device or to perform network testing.

BRIEF DESCRIPTION OF THE DRAWINGS

FIG. 2 is a block diagram illustrating a format of a device ID for a radio communication protocol, according to some embodiments.

Figure 1:
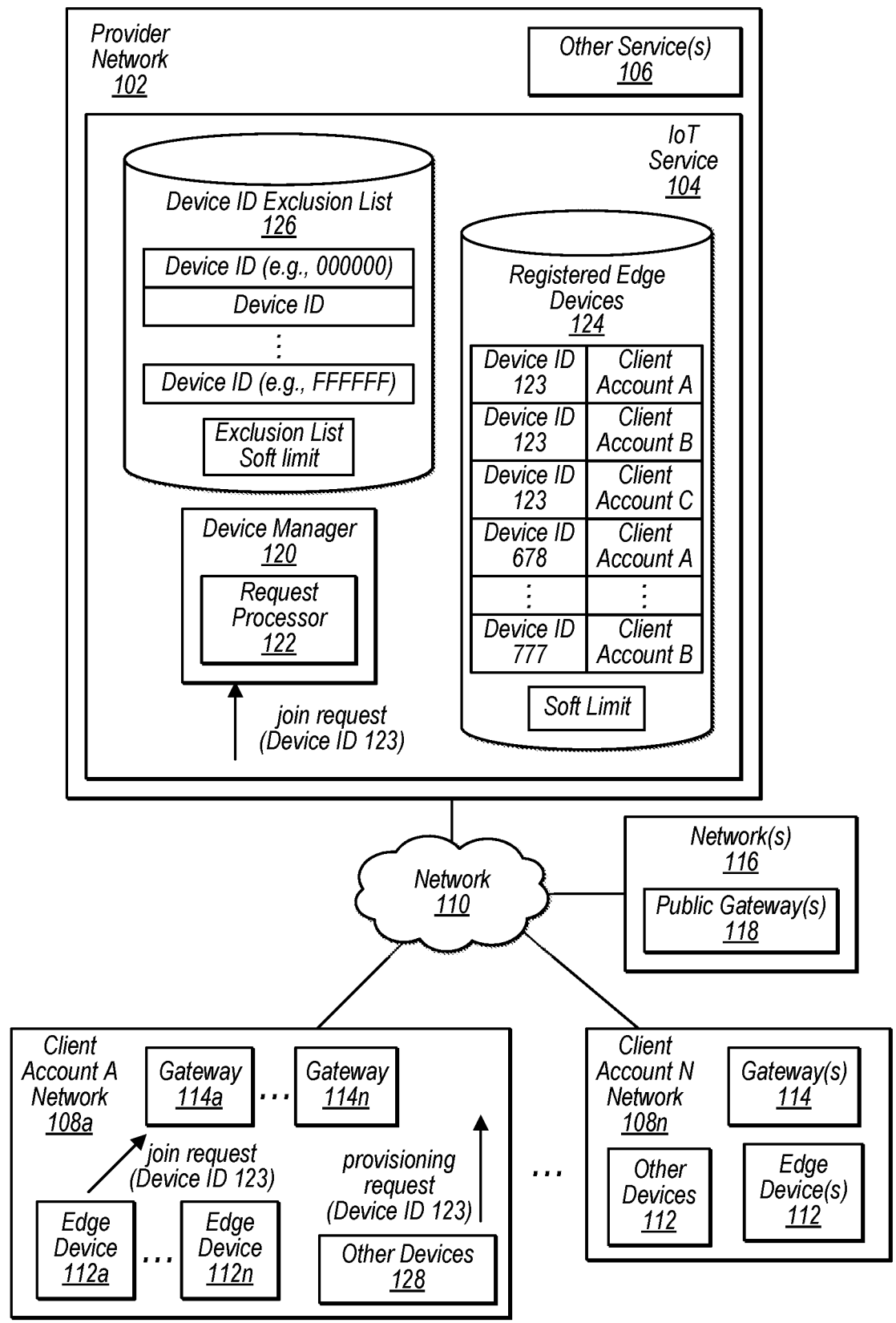
FIG. 1 is a logical block diagram illustrating a system for managing duplicate device identifiers for edge devices of client networks that use a radio communication protocol, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to manage duplicate device identifiers for edge devices of client networks that use a radio communication protocol, according to some embodiments. In embodiments, managing duplicate device identifiers for edge devices of client networks that use a radio communication protocol may allow may greatly reduce the number of provision requests and/or join requests that are rejected by a provider network that manages edge devices of client networks that use a radio communication protocol, compared to traditional techniques.

As used herein, "provisioning" an edge device may be considered equivalent to or having the same meaning as "registering" the edge device, and vice versa. Therefore, a request to provision an edge device (e.g., provision request) may be considered equivalent to a request to register the edge device (e.g., registration request), and vice versa. A registered device may be considered a provisioned device, and vice versa.

In embodiments, an IoT service of a provider network may implement at least some or all of the functionality that local onsite servers would have performed according to traditional techniques. Traditionally, a company may have specified a group of local network servers (e.g., LoRaWAN network servers) as the core network for managing edge devices that use a radio communication protocol. In embodiments, the IoT service may be responsible to accept/reject provision requests to provision and edge device, accept/reject join requests from edge device, authenticate/authorize edge devices' traffic, and manage any other aspects of the devices. Besides these responsibilities, the IoT service may also route the edge devices' traffic to destinations (e.g., a client-owned cloud application running at the provider network) or route traffic from the provider network to edge devices.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for managing duplicate device identifiers for edge devices of client networks that use a radio communication protocol. A number of different methods and techniques to manage duplicate device identifiers for edge devices of client networks that use a radio communication protocol, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for managing duplicate device identifiers for edge devices of client networks that use a radio communication protocol, according to some embodiments.

As shown, a provider network 102 includes an IoT service 104 that implements managing duplicate device identifiers for edge devices of client networks that use a radio communication protocol. In the example embodiment, the provider network 102 may include any number of other services 106. For example, a service 106 may implement a client-owned application that receives data (e.g., packets/payload data) from client edge devices and/or sends data to client edge devices. In various embodiments, any described functionality of the IoT service may instead be implemented by one or more of the other services 106 (e.g., storing client ID exclusion lists or any information for registered edge devices, device authentication/provisioning).

In the depicted embodiment, any number of clients of the IoT service 104 may use the IoT service 104 of the provider network 102 via communication between the IoT service 104 and a remote network 108 (e.g., client account A network) of an account of a corresponding client of the IoT service (e.g., via a wide area network 110, such as the internet). For example, client A may own/manage the client account A network 108a, which may include any number of edge devices 112 that send data to a client-owned application(s) of the provider network 102 and/or receive data from client-owned application(s) via the IoT service 104 (e.g., as edge devices that are registered with the IoT service 104 and have joined the edge network of edge devices managed by the IoT service). Similarly, any number of other clients may use the IoT service 104 with any number of other edge devices in the same or similar manner as shown for the client account A network 108a (e.g., using any number of edge devices and/or gateways 114 of other client network(s)).

In some embodiments, a client (e.g., user, company, or other entity registered as a client) of the IoT service 104 may have any number of accounts set up with the IoT service, and any of those accounts may have one or more networks 108 of edge devices 112 that are managed/associated with the client account. For example, a particular client of the IoT service may have account A and another account N. That particular client may manage client account A network 108a when logged into the IoT service under account A and may also manage client account N network 108n when logged into the IoT service under account N.

As shown, a client network may include any number of gateways 114 that allow for edge devices to communicate with the IoT service. For example, an edge device may transmit messages to a gateway according to a radio communication protocol (or "radio protocol") such as LoRaWAN, and those messages are forwarded on to the IoT service (e.g., via an a web socket/internet protocol).

In some embodiments, one or more of the gateways of a client network may be considered "private" because only edge devices of the client (e.g., owned/managed by client A) connect to the private gateways to communicate with the IoT service. In other words, a private gateway is reserved for client edge devices of the client network to communicate with the provider network.

As shown, any number of other networks 116 may be in communication with the provider network and/or client networks via the wide-area network 110. For example, one or more of the networks 116 may include one or more public gateways 118 that allow edge devices (e.g., with roaming capability) of multiple different clients to connect to communicate with the IoT service. In some embodiments, any of the client networks 108 may have also have one or more public gateways.

In the depicted embodiment embodiments, the IoT service 104 includes a device manager 120 that may perform any number of tasks to manage any number of edge devices for any of the clients of the IoT service (e.g., processing join requests, device registration/provisioning requests, authentication, data routing). As shown, the device manager 120 includes a request processor 122 that may determine whether to accept or reject requests from edge devices to join the edge network of edge devices (e.g., the network of edge devices of the client accounts managed by the IoT service). In embodiments, the request processor may also accept requests to provision edge devices, although in various embodiments this functionality may be performed by any another component of the IoT service.

As shown, the IoT service may also may store/manage data that identifies registered edge devices 124. As shown, registered edge devices 124 associates/maps the device ID of an edge device to the client account that the edge device is registered to (e.g., as an activated edge device). For example, when the request processor 122 accepts a registration request for an edge device of client account A that specifies "678" as the device ID, then the IoT service stores an entry/data that associates device ID 678 with client account A to indicate that the edge device is registered with client account A.

In embodiments, the IoT service may store any other data as associated with the device ID. For example, in addition to associating device ID 678 with client account A, the IoT service may also store a key associated with the edge device registered with client account A, which may be used to calculate a result (e.g., a message integrity code (MIC). In embodiments, the key may be provided to the IoT service by a user when the edge device is provisioned (e.g., a pre-shared encryption key). The key may be an encryption key that is unique to the particular edge device and may be applied to contents of at least a portion of a join request in order to calculate a unique result based on the key (e.g., MIC). In embodiments, the result/MIC may be used when determining whether to accept a join request, as discussed below. As shown, the IoT service also includes a device ID exclusion list 126, which is discussed below.

In embodiments, at least some or all of the entries in the registered edge devices 124 and/or the device ID exclusion list 126 may be maintained (added, removed, etc.) by the IoT service 104 and/or the client. For example, the device manager 120 may add entries in response to new edge devices that are registered with the IoT service. In some embodiments, a user/administrator of a client may add/remove entries via an application programming interface (API) of the IoT service (e.g., using a computing device 128 at the client network that includes a graphical user interface (GUI) or command line interface (CLI) to provide data to the IoT service).

In embodiments, the IoT service (e.g., request processor or other management component) may receive from a client/user (e.g., from a device 128 of a client network), a request to register an edge device with the IoT service. The request may include a requested device ID to be assigned to the edge device. According to a radio communication protocol (e.g., LoRaWAN) used by the edge device, a portion of a join request from a given edge device to join a given network is reserved for assignment of a device ID that uniquely identifies the given edge device with respect to other edge devices of the given network (e.g., DevEUI for LoRaWAN). Therefore, the requested device ID is provided by the client/user so that the edge device can provide it in a request to join the edge network of edge devices managed by the IoT service (e.g., after the edge device is provisioned by the IoT service). In embodiments, the device ID may be a unique hardware identifier assigned to the edge device. As discussed herein, in some embodiments the provision request may also include an encryption key associated with the edge device that is stored/maintained by the IoT service in association with the requested device ID.

In response to the request to register the edge device, the IoT service may determine whether there are one or more other edge devices that are registered with the IoT service as registered devices based on a duplicate device ID associated with the registered devices that matches the requested device ID. For example, one or more of the currently registered edge devices may have been previously registered by using the same device ID in a registration request.

In embodiments, the request processor may check the registered edge devices 124 and if it finds one or more matching entries for the device ID, then it will determine that there are one or more devices that are registered based on the duplicate ID. If there are no matches, then the device manager may accept the request to register the edge device and add an entry for the edge device to the registered edge devices (e.g., device ID, client account ID such as "Client Account A," unique device key, etc.).

In some embodiments, in response to a determination that there are one or more other edge devices registered with the IoT service based on the duplicate device ID, the IoT service may determine whether to accept (or reject) the request to register the edge device with the IoT service. In some embodiments, to determine to accept the request, the service may determine (based on registered edge devices 124) that the requested device ID is unique with respect to other device IDs associated with other registered edge devices for the same client account of the client (e.g., client account A). In response, the IoT service may register the edge device with the IoT service as a registered edge device associated with the duplicate device ID. Therefore, the service may accept the request to register the edge device and add an entry for the edge device to the registered edge devices (e.g., device ID, client account ID such as "Client Account A," unique device key, etc.).

As discussed below, one or more additional criteria may be required in addition to the above (or instead of) for the service to accept the registration request (e.g., using a soft limit for the number of duplicate IDs allowed or using a different soft limit for the number of duplicate IDs allowed that are on an exclusion list of device IDs). For example, the service may determine that, if the edge device becomes registered with the IoT service, a number of edge devices registered with the IoT service and associated with the same duplicate device ID will remain within a predefined threshold (soft limit). In response to this determination, the service may accept the request to register the edge device.

In various embodiments, the device manager 120 may accept the registration request if the requested device ID is on a device ID exclusion list 126 and a number of edge devices registered with the IoT service and associated with the duplicate device ID will remain within a predefined threshold (e.g., the same or a different limit than the soft limit above) if the edge device becomes registered. If the device ID is on the exclusion list but the number of edge devices registered with the IoT service and associated with the duplicate device ID will not remain within a predefined threshold, then the service may reject the registration request.

As shown, the exclusion list may include device IDs that are popular for using for testing purposes (e.g., all 0's, all 1's, etc.). In embodiments, the service may also determine whether the requested ID is unique within the client account before registering the device ID (otherwise, it may reject the join request). Accepting provision requests based on an device ID exclusion list with a larger threshold (exclusion list soft limit) for the number of allowed duplicate device IDs than the threshold (soft limit) for device IDs that are not on the device ID exclusion list may provide a convenient way for clients to use a large number of edge devices in a testing environment, without causing errors that may otherwise occur when the service tries to register the duplicate IDs for many different clients that registering devices with commonly used device IDs for testing purposes. For example, the exclusion list may allow a client to register a popular testing ID for testing purposes that the service would otherwise reject if it used the lower soft limit.

In embodiments, the IoT service may also accept registration requests for roaming edge devices. A roaming edge device may be capable of joining different networks other than the edge network managed by the IoT service 104 or provider network 102. For example, the edge device may use a gateway of a client network and at a later time use a public gateway 118 of a different service provider network. In some embodiments, the service may receive, from a client, a request to register an edge device with the IoT service. As discussed above, the request may include a requested device ID. The request may also indicate that the edge device is to have roaming capability (e.g., the device is to be a roaming device). Based on the indication that the edge device is to be a roaming edge device, the service may determine whether the other requested device ID is unique with respect to other device IDs of the edge devices the edge network. In response to determining that the requested device ID is unique with respect to other device IDs of the edge devices of the edge network (e.g., all of the edge devices across all of the different client networks), the service may register the edge device as a roaming device based on the requested device ID.

Figure 5:
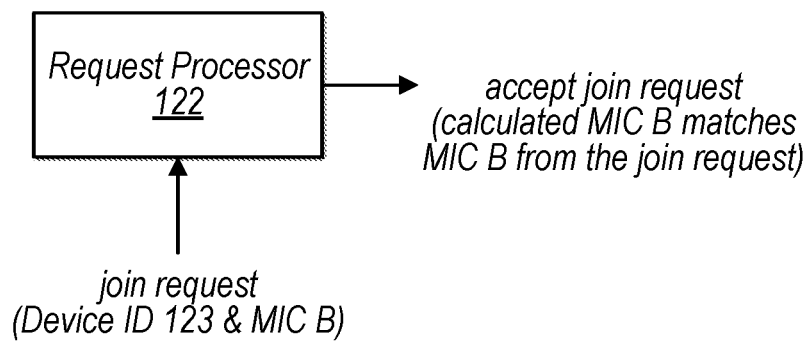
FIG. 5 illustrates accepting a join request based on a duplicate device ID, according to some embodiments.
Figure 6:
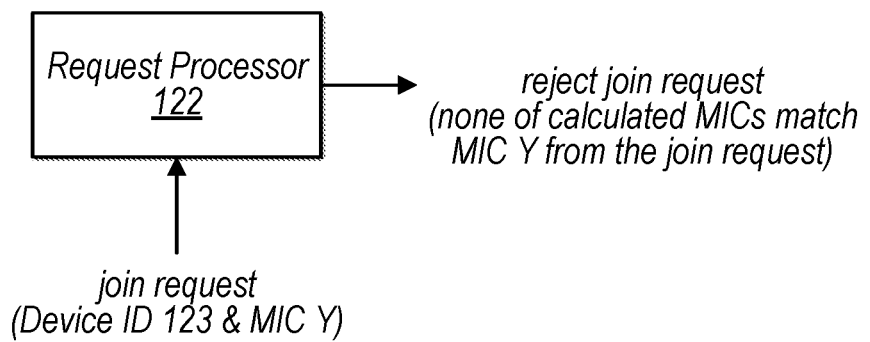
FIG. 6 illustrates rejecting a join request based on a duplicate device ID, according to some embodiments.

Once a device is registered with the IoT service, then a subsequent join request from that edge device may be accepted, even though the edge device was registered based on a duplicate device ID used by one or more other registered edge devices. FIGS. 5 and 6 illustrate examples of accepting or requesting a join request based on duplicate device IDs.

FIG. 2 is a block diagram illustrating a format of a device ID for a radio communication protocol, according to some embodiments.

In the depicted embodiment, the device ID format 202 depicts a device ID format according to a version of the LoRaWAN specification/protocol. However, in embodiments, the same or similar format may be used for another radio communication protocol that specifies a unique device ID to be assigned to edge devices of a network.

As shown, the first three bytes are reserved for storing a vendor code (e.g., a predefined code assigned to a company/organization that manufactures or provides edge devices). The last five bytes are reserved for storing a unique address/identifier for the edge device. In various embodiments, any other amount of space (e.g., number of bytes/bits) may be reserved for storing a unique device ID to be assigned to edge devices of a network, depending on the radio protocol used.

Figure 3:
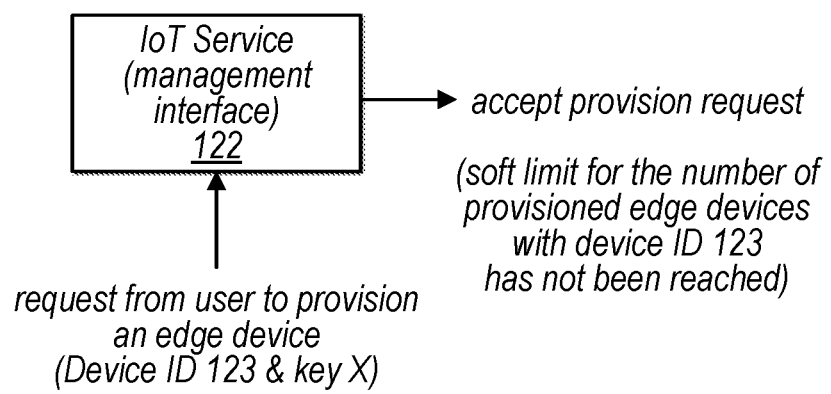
FIG. 3 illustrates accepting a provision request for an edge device based on a duplicate device ID, according to some embodiments.

FIG. 3 illustrates accepting a provision request for an edge device based on a duplicate device ID, according to some embodiments.

Figure 4:
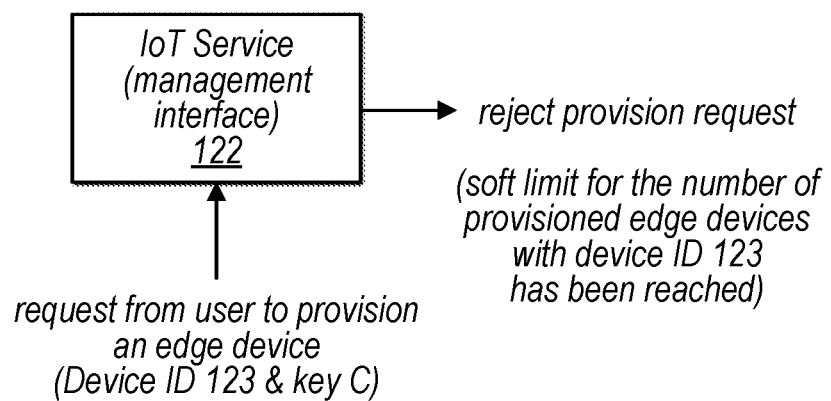
FIG. 4 illustrates rejecting a provision request based on a soft limit for the number of registered devices associated with a duplicate device ID, according to some embodiments.

As shown in FIGS. 3 and 4, the IoT service may associate (e.g., via a data store/data structure 302 such as registered edge devices 124 of FIG. 1) a duplicate device ID with multiple different keys that are unique for each of the edge devices. Similarly, FIGS. 5 and 6 show the same or similar data store/data structure 302 that may be used to associate a duplicate device ID with multiple different message integrity codes (MICs).

A client (e.g., a user at a remove client network) may send a request to the IoT service to provision/register an edge device. In the depicted example, the request indicates device ID 123 and a key X. "Device ID 123" may represent any suitable device identifier in any suitable format may identify the edge device. "Key X," "key A," or any other key illustrated in the figures may represent a suitable encryption key that is unique to a particular edge device with respect to any of the other edge devices of the edge network. For example, key A may be a unique key and therefore different than key B, key X, or any other key associated with another edge device.

In embodiments, a given key is pre-shared with the IoT service during provisioning of a given edge device. For example, during provision of a particular edge device, device ID 123 may have been provided as its identifier, and key A may have been provided to the service as the unique key of the particular edge device. Therefore, the service may store key A as associated with device ID 123. Similarly, the service may store key B as associated with device ID 123 based on a different provision/registration request for a different edge device.

In response to receiving the request to provision the edge device, the service may determine that there are one or more edge devices registered with the IoT service based on a duplicate device ID (device ID 123). For example, the service may determine that there are two edge devices registered based on device ID 123 because there are entries in the table/data structure for two unique keys associated with device ID 123. As shown, the duplicate device ID threshold (soft limit) is set to "3." Since number of edge devices registered with the IoT service and associated with the duplicate device ID will remain within a the predefined threshold of "3" after adding a new entry for key X, the service may accept the request to provision the edge device.

FIG. 4 illustrates rejecting a provision request based on a soft limit for the number of registered devices associated with a duplicate device ID, according to some embodiments.

In response to receiving a request to provision an edge device with a duplicate device ID (device ID 123) and key C, the service may determine that there are one or more edge devices registered with the IoT service based on the duplicate device ID (device ID 123). For example, the service may determine that there are three edge devices registered based on device ID 123 because there are new entries in the table/data structure for three unique keys associated with device ID 123.

As shown, the duplicate device ID threshold (soft limit) is set to "3." Since number of edge devices registered with the IoT service and associated with the duplicate device ID will not remain within a the predefined threshold of "3" if a new entry for key X is added, the service may reject the request to provision the edge device. By enforcing the soft limit of 3 edge devices that can be registered based on the same duplicate device ID, the service may prevent its processing time from becoming too long when handling join requests that indicate duplicate device IDs (due to the processing time to calculate message integrity codes (MICs), as discussed below).

FIG. 5 illustrates accepting a join request based on a duplicate device ID, according to some embodiments.

As shown, the service receives a request from an edge device to join the edge network. In response to receiving the request to join, the service may obtain, based on the radio communication protocol, at least a device ID from a portion of the request. For example, the service may obtain, based on the LoRaWAN protocol, a device ID from a particular portion of the request (device ID 123). As shown, the service may also obtain an MIC from the join request (MIC B).

In response to determining that the obtained device ID matches the duplicate device ID (device ID 123), the service may calculate one or more message integrity codes (MICs) based on the request to join and one or more keys associated with one or more respective edge devices that are registered with the IoT service based on the duplicate device ID. For example, the MIC B may be calculated by the service based on a function of a key of the corresponding edge device (key B) and at least a portion of the message content of the join request (e.g., encrypting the portion using key B to generate a result). In response to determining that MIC B from the request matches the calculated MIC B (calculated by the service), the service may accept the request to join. Note that in embodiments, the service may determine that any number of other calculated MICs do not match MIC B before finding the above match (e.g., the service may determine that calculated MIC A does not match).

FIG. 6 illustrates rejecting a join request based on a duplicate device ID, according to some embodiments.

As shown, the service receives a request from an edge device to join the edge network. In response to receiving the request to join, the service may obtain, based on the radio communication protocol, at least a device ID from a portion of the request. For example, the service may obtain, based on the LoRaWAN protocol, a device ID from a particular portion of the request (device ID 123). As shown, the service may also obtain an MIC from the join request (MIC Y).

In response to determining that the obtained device ID matches the duplicate device ID (device ID 123), the service may calculate one or more message integrity codes (MICs) based on the request to join and one or more keys associated with one or more respective edge devices that are registered with the IoT service based on the duplicate device ID. For example, the MICs A, B, and X may each be calculated by the service based on key A, key B, and key X and at least a portion of the message content of the join request (e.g., encrypting the portion using a key to generate a result). In response to determining that a MIC from the request does not match any of the one or more calculated MICs (e.g., MICs A, B, or X), the service may reject the request to join. Note that in embodiments, the service may determine that every calculated MICs does not match MIC Y before rejecting the request to join. This may be a time consuming process. Therefore, soft limits (discussed above) may be implemented to limit the amount of processing time used for join requests.

Figure 7:
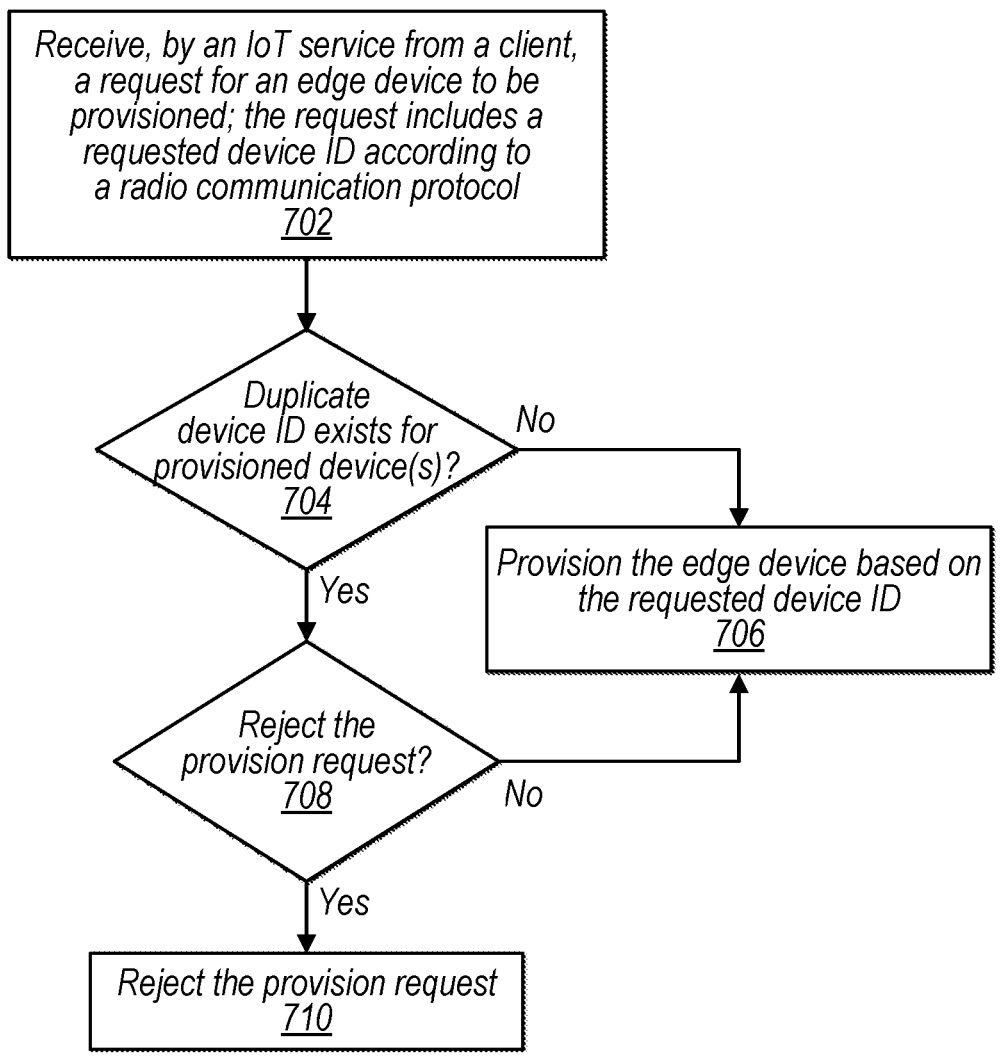
FIG. 7 is a high-level flowchart illustrating various methods and techniques to manage duplicate device identifiers for edge devices of client networks that use a radio communication protocol, according to some embodiments.

FIG. 7 is a high-level flowchart illustrating various methods and techniques to manage duplicate device identifiers for edge devices of client networks that use a radio communication protocol, according to some embodiments. In various embodiments, any of the functionality described for any portions of the flowcharts 7-8 may be performed by any of the components of FIGS. 1-6 and/or 9.

Figure 8:
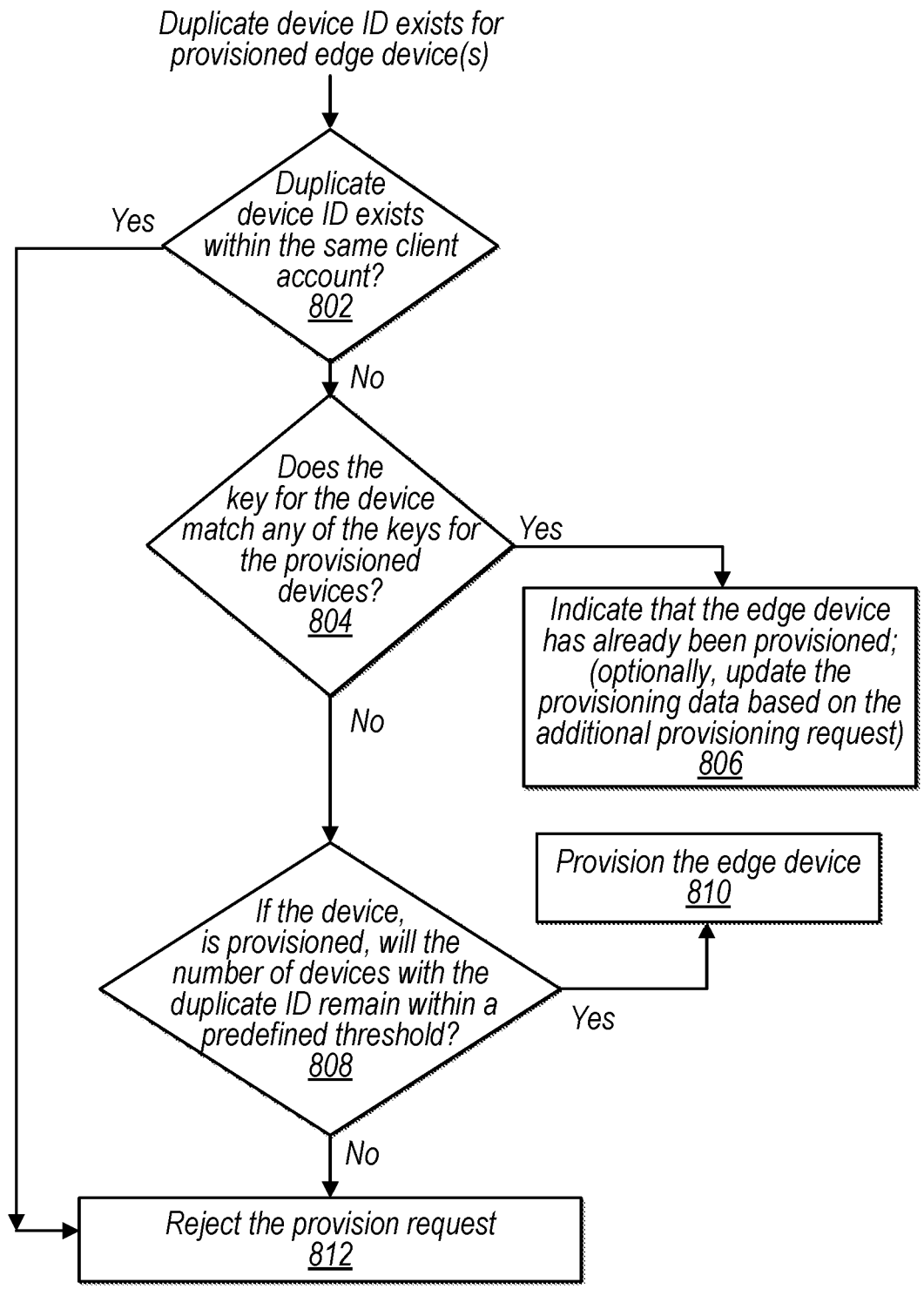
FIG. 8 is a high-level flowchart illustrating various methods and techniques to manage duplicate device identifiers for edge devices of client networks that use a radio communication protocol, according to some embodiments.

These techniques, as well as the techniques discussed with regard to FIG. 8, may be implemented using components or systems as described above with regard to FIGS. 1-6, as well as other types of components or systems, and thus the following discussion is not intended to be limiting as to the other types of systems that may implement the described techniques. For example, any of the techniques may be implemented by one or more services of a provider network and/or a local service/application of a client network.

At block 702, the IoT service receives, from a client, a request for an edge device to be provisioned. The request may include a requested device ID in accordance with a radio communication protocol (e.g., DevEUI for LoRaWAN). At block 704, the IoT service determines whether any duplicate device IDs exist for other registered device(s) that match the requested device ID. If not, then at block 706, the service provisions the edge device based on the requested device ID.

Returning to block 704, if the IoT service determines that there are duplicate device IDs exist for other registered device(s), then at block 708, the service determines whether to accept or reject the provision request. For example, the service may determine whether the requested ID is unique within the client account, whether the soft limit for duplicate device IDs will be satisfied if the edge device is registered, and/or whether the device ID is on an excluded list and if so, whether another soft limit for duplicate device IDs on the excluded list will be satisfied if the edge device is registered. If the service accepts the provision request, then at block 706, the service registers the edge device based on the requested device ID. If not, then at block 710, the service rejects the join request.

FIG. 8 is a high-level flowchart illustrating various methods and techniques to manage duplicate device identifiers for edge devices of client networks that use a radio communication protocol, according to some embodiments.

At block 802, after determining that a duplicate device ID (a device ID that matches the requested ID for the edge device) exists for one or more particular registered devices (e.g., block 704 of FIG. 7), the IoT service determines whether a duplicate device ID exists for the client account that manages the edge device (e.g., a device registered within the same client account). If not, then at block 804, the IoT service determines whether a key from the provision request matches any of the keys for the particular registered devices that are registered/provisioned based on the duplicate device ID. If so, then at block 806, the service indicates that the edge device has already been provisioned. In some embodiments, the service may update the provisioning data stored by the service for the edge device based on the additional provision request for the edge device. For example, the additional provision request may change the device from non-roaming to roaming or vice versa.

If there is no matching key for the particular registered devices at block 804, then at block 808, the service determines whether the number of edge devices registered with the duplicate device ID will remain within a predefined threshold (e.g., soft limit) if the edge device is provisioned. If so, then at block 810, the service provisions the edge device. In embodiments, the service may also add the key from the provision request to a group/list of keys of edge devices that are registered based on the duplicate device ID. If not, then at block 812, the service rejects the provision request.

Returning to block 802, the service will reject the provision the request if the duplicate device ID already exists for that client account (e.g., within the same client account). This prevents the problems of a duplicate device ID being used within the same private client account/network, while also allowing different client accounts to use the same duplicate device ID across different private client accounts/networks (as long as the total number of edge devices that are registered based on the duplicate device ID remains within the soft limit).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of the IoT service and any other components that implement the techniques described herein). The various methods as illustrated in the figures and described herein represent example embodiments of methods. The order of any method may be changed, and various elements may be added, reordered, combined, omitted, modified, etc.

Embodiments to implement managing duplicate device identifiers for edge devices of client networks that use a radio communication protocol, which may interact with various other systems or devices. One such computer system is illustrated by FIG. 8. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., IoT service and any other components) are shown stored within system memory 920 as program instructions 925 and data storage 935, respectively. In other embodiments, program instructions and/or data may be received, sent or stored upon different types of computer-accessible media or on similar media separate from system memory 920 or computer system 900. A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

Figure 9:
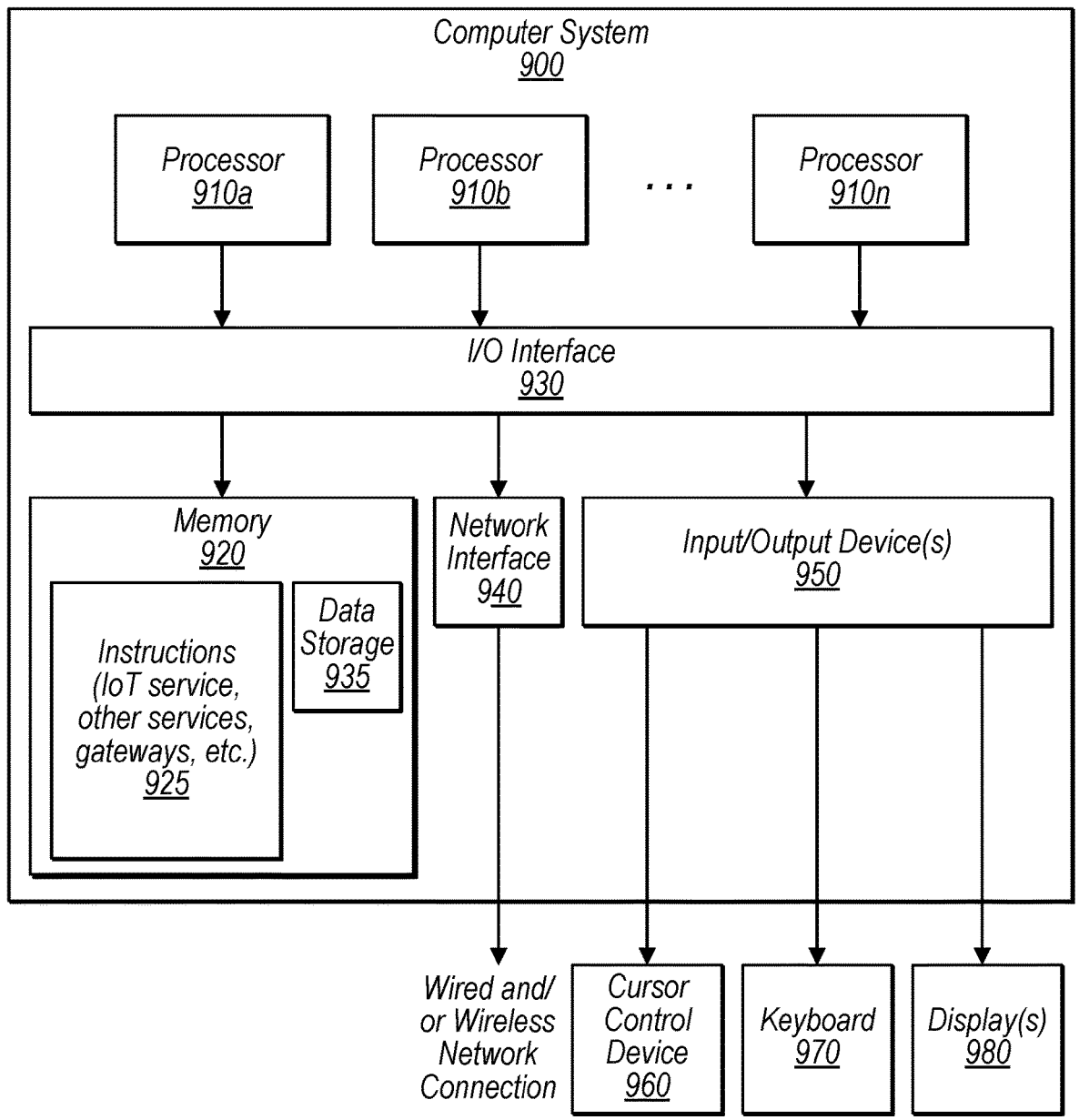
FIG. 9 is a block diagram illustrating an example computing system, according to some embodiments.

As shown in FIG. 9, memory 920 may include program instructions 925 that implement the various embodiments of the systems as described herein, and data store 935, comprising various data accessible by program instructions 925, in one embodiment. In one embodiment, program instructions 925 may include software elements of embodiments as described herein and as illustrated in the Figures. Data storage 935 may include data that may be used in embodiments (e.g., mappings, device identifiers, messages, etc.). In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors and one or more memories, wherein the one or more memories have stored thereon instructions, which when executed by the one or more processors, cause the one or more processors to implement an IoT service that manages an edge network of edge devices for a plurality of clients of a provider network, wherein the IoT service of the provider network is configured to, for a given client:
receive, from the client, a request to register an edge device of a remote network of the client, wherein the request comprises a requested device ID to be assigned to the edge device, wherein according to a radio communication protocol used by the edge device, a portion of a join request from a given edge device to join a given network is reserved for assignment of a device ID that uniquely identifies the given edge device with respect to other edge devices of the given network;
in response to the request, determine whether there are one or more other edge devices that are registered with the IoT service as one or more registered edge devices based on a duplicate device ID associated with the one or more other registered edge devices that matches the requested device ID,
wherein for individual one of the one or more other edge devices, the IoT service registered the other edge device based on reception of another request to register the other edge device, wherein the other request comprised the duplicate device ID as a requested device ID to be assigned to the other edge device;
in response to a determination that one or more other edge devices are registered with the IoT service based on the duplicate device ID, determine whether to accept the request to register the edge device with the duplicate device ID to be assigned to the edge device, wherein to determine whether to accept the request to register the edge device, the IoT service is configured to determine whether the requested device ID for the edge device is unique with respect to other device IDs associated with other registered devices for a client account of the client; and
in response to a determination to accept the request to register the edge device, register the edge device with the IoT service as a registered edge device associated with the duplicate device ID.

2. The system as recited in claim 1, wherein the IoT service manages the edge network of edge devices for a plurality of client accounts of the plurality of clients of the provider network, wherein the request is received from the client account of the client, and wherein to determine to accept the request to register the edge device, the IoT service is further configured to:
determine that the requested device ID is unique with respect to the other device IDs associated with the other registered edge devices for the client account of the client.

3. The system as recited in claim 2, wherein to determine to accept the request to register the edge device, the IoT service is further configured to:
determine that, if the edge device becomes registered with the IoT service, a number of edge devices registered with the IoT service and associated with the duplicate device ID will remain within a predefined threshold.

4. The system as recited in claim 1, wherein to determine to accept the request to register the edge device with edge network, the IoT service is further configured to:
determine whether the requested device ID belongs to an exclusion list of device IDs and whether a number of edge devices registered with the IoT service and associated with the duplicate device ID will remain within a predefined threshold if the edge device becomes registered; and
in response to a determination that the requested device ID belongs to the exclusion list of device IDs and that the number of edge devices registered with the IoT service and associated with the duplicate device ID will remain within the predefined threshold if the edge device becomes registered, register the edge device with the IoT service as a registered edge device associated with the requested ID.

5. The system as recited in claim 1, wherein the radio communication protocol is a low-power wide-area network (LoRaWAN) protocol.

6. A method, comprising:
performing, by one or more computing devices of a provider network:
receiving, by an IoT service from a client, a request to register an edge device of a remote network of the client with the IoT service, wherein the IoT service manages an edge network of edge devices, and wherein the request comprises a requested device ID, and wherein according to a radio communication protocol used by the edge device, a portion of a join request from a given edge device to join a given network is reserved for assignment of a device ID that uniquely identifies the given edge device with respect to other edge devices of the given network;
determining whether there are one or more edge devices registered with the IoT service based on a duplicate device ID for the one or more edge devices that matches the requested device ID;
in response to determining that one or more edge devices are registered with the IoT service based on the duplicate device ID, determining whether to accept the request to register the edge device with the duplicate device ID, wherein determining whether to accept the request to register the edge device comprises determining whether the requested device ID for the edge device is unique with respect to other device IDs associated with other registered devices for a client account of the client; and
in response to determining to accept the request to register the edge device, registering the edge device with the IoT service as a registered edge device based on the duplicate device ID.

7. The method as recited in claim 6, wherein the IoT service manages the edge network of edge devices for a plurality of client accounts of a plurality of clients of the provider network, wherein the request is received from the client account of the client, and wherein determining to accept the request to register the edge device comprises:
determining that the requested device ID is unique with respect to the other device IDs associated with the other registered edge devices for the client account of the client.

8. The method as recited in claim 6, wherein determining to accept the request to register the edge device comprises:
determining that, if the edge device becomes registered with the IoT service, a number of edge devices registered with the IoT service and associated with the duplicate device ID will remain within a predefined threshold.

9. The method as recited in claim 8, further comprising:
receiving, by the IoT service from the edge device, a request to join the edge network;
in response to receiving the request to join, obtain, based on the radio communication protocol, at least a device ID from the request to join;
in response to determining that the obtained device ID matches the duplicate device ID, calculate one or more message integrity codes (MICs) based on the request to join and one or more keys associated with one or more respective edge devices that are registered with the IoT service based on the duplicate device ID,
wherein a particular one of the one or more calculated MICs is based on a key associated with the edge device; and in response to determining that an MIC from the request to join matches the particular calculated MIC, accept the request to join.

10. The method as recited in claim 9, further comprising:
receiving, by the IoT service from another edge device, a request to join the edge network;
in response to receiving the request to join, obtain, based on the radio communication protocol, at least a device ID from the request to join;
in response to determining that the obtained device ID matches the duplicate device ID, calculate one or more MICs based on the request to join and one or more keys associated with one or more respective edge devices that are registered with the IoT service based on the duplicate device ID; and
in response to determining that an MIC from the request to join does not match any of the one or more calculated MICs, reject the request to join.

11. The method as recited in claim 8, wherein the IoT service manages the edge network of edge devices for a plurality of client accounts of a plurality of clients of the provider network, wherein the request is received from a client account of the client, and wherein determining to accept the request to register the edge device comprises:
determining that the requested device ID is unique with respect to other device IDs associated with other registered edge devices for the client account of the client; and
determining that, if the edge device becomes registered with the IoT service, a number of edge devices registered with the IoT service and associated with the duplicate device ID will remain within a predefined threshold.

12. The method as recited in claim 11, further comprising:
receiving, by the IoT service from the client account of the client, another request to register another edge device with the IoT service, and wherein the other request comprises another requested device ID;
determining that the other requested device ID is unique with respect to other device IDs associated with other registered edge devices for the client account of the client;
in response to determining that the other requested device ID belongs to an exclusion list of device IDs and that a number of edge devices registered with the IoT service and associated with the other requested device ID will remain within a different predefined threshold if the other edge device becomes registered, register the other edge device with the IoT service as a registered edge device associated with the other requested ID.

13. The method as recited in claim 6, further comprising:
receiving, by the IoT service from the client, another request to register another edge device with the IoT service, wherein the other request comprises another requested device ID, and wherein the other request indicates that the other edge device is to be a roaming device;
determine, based on the indication that the other edge device is to be a roaming edge device, whether the other requested device ID is unique with respect to other device IDs of the edge devices the edge network; and
in response to determining that the other requested device ID is unique with respect to other device IDs of the edge devices of the edge network, register the other edge device based on the other requested device ID.

14. The method as recited in claim 6, further comprising, wherein the radio communication protocol is a low-power wide-area network (LoRaWAN) protocol.

15. One or more non-transitory computer-accessible storage media storing program instructions that when executed on or across one or more processors cause the one or more processors to:
- receive, by an IoT service of a provider network from a client, a request to register an edge device of a remote network of the client with the IoT service, wherein the IoT service manages an edge network of edge devices, and wherein the request comprises a requested device ID, and wherein according to a radio communication protocol used by the edge device, a portion of a join request from a given edge device to join a given network is reserved for assignment of a device ID that uniquely identifies the given edge device with respect to other edge devices of the given network;
- determine whether there are one or more edge devices registered with the IoT service based on a duplicate device ID for the one or more edge devices that matches the requested device ID;
- in response to a determination that one or more edge devices are registered with the IoT service based on the duplicate device ID, determine whether to accept the request to register the edge device with the duplicate device ID, wherein the program instructions when executed on or across the one or more processors cause the one or more processors to determine whether the requested device ID for the edge device is unique with respect to other device IDs associated with other registered devices for a client account of the client; and
- in response to a determination to accept the request to register the edge device, registering the edge device with the IoT service as a registered edge device based on the duplicate device ID.

16. The one or more storage media as recited in claim 15, wherein the IoT service manages the edge network of edge devices for a plurality of client accounts of a plurality of clients of the provider network, wherein the request is received from the client account of the client, and wherein to determine to accept the request to register the edge device, the program instructions when executed on or across the one or more processors further cause the one or more processors to:
- determine that the requested device ID is unique with respect to the other device IDs associated with the other registered edge devices for the client account of the client.

17. The one or more storage media as recited in claim 15, wherein to determine to accept the request to register the edge device, the program instructions when executed on or across the one or more processors further cause the one or more processors to:
- determine that, if the edge device becomes registered with the IoT service, a number of edge devices registered with the IoT service and associated with the duplicate device ID will remain within a predefined threshold.

18. The one or more storage media as recited in claim 15, wherein to determine to accept the request to register the edge device, the program instructions when executed on or across the one or more processors further cause the one or more processors to:
- determine whether the requested device ID belongs to an exclusion list of device IDs and whether a number of edge devices registered with the IoT service and associated with the duplicate device ID will remain within a predefined threshold if the edge device becomes registered; and
- in response to a determination that the requested device ID belongs to the exclusion list of device IDs and that the number of edge devices registered with the IoT service and associated with the duplicate device ID will remain within the predefined threshold if the edge device becomes registered, register the edge device with the IoT service as a registered edge device associated with the requested ID.

19. The one or more storage media as recited in claim 15, wherein the program instructions when executed on or across the one or more processors further cause the one or more processors to:
- receive, by the IoT service from the client, another request to register another edge device with the IoT service, wherein the other request comprises another requested device ID, and wherein the other request indicates that the other edge device is to be a roaming device;
- determine, based on the indication that the other edge device is to be a roaming edge device, whether the other requested device ID is unique with respect other device IDs of the edge devices the edge network; and
- in response to a determination that the other requested device ID is unique with respect to other device IDs of the edge devices of the edge network, register the other edge device based on the other requested device ID.

20. The one or more storage media as recited in claim 15, wherein the radio communication protocol is a low-power wide-area network (LoRaWAN) protocol.

* * * * *